United States Patent [19]
Schneider et al.

[11] 4,105,359
[45] Aug. 8, 1978

[54] ADAPTOR FOR COUNTERSINKING DEVICE

[75] Inventors: Eberhard Schneider, Cologne; Theodor Vitt, Porz-Eil, both of Fed. Rep. of Germany

[73] Assignee: Prameta Prazisonsmetallund Kunststofferzeugnisse G. Baumann & Co., Fed. Rep. of Germany

[21] Appl. No.: 785,040

[22] Filed: Apr. 6, 1977

[51] Int. Cl.² .............................................. B23B 39/00
[52] U.S. Cl. ................................................... 408/112
[58] Field of Search ......................................... 408/112

[56] References Cited
U.S. PATENT DOCUMENTS

| | | | |
|---|---|---|---|
| 2,360,942 | 10/1944 | Ellerstein | 408/112 |
| 2,426,124 | 8/1947 | Skwierawski | 408/112 |
| 2,527,968 | 10/1950 | Sherman et al. | 408/112 |
| 2,612,793 | 10/1952 | Timpner | 408/112 |
| 2,918,833 | 12/1959 | Stewart et al. | 408/112 |
| 2,997,900 | 8/1961 | Pugsley | 408/112 |
| 3,293,953 | 12/1966 | Hendrick | 408/112 |
| 3,708,238 | 1/1973 | Kissane | 408/112 |
| 3,838,935 | 10/1974 | Boyajian | 408/112 |

Primary Examiner—Harrison L. Hinson

[57] ABSTRACT

This disclosure relates to an adaptor for a countersinking device and includes a pair of plates disposed in generally parallel relationship to each other and being relatively movable between minimum and maximum distances, the first plate carrying a countersinking tool, the second plate having an aperture in alignment with the countersinking tool, means normally urging the plates toward their relative position of maximum spacing, and adjustable stop means for limiting the relative movement of the plates toward their minimum position of relative spacing.

4 Claims, 3 Drawing Figures

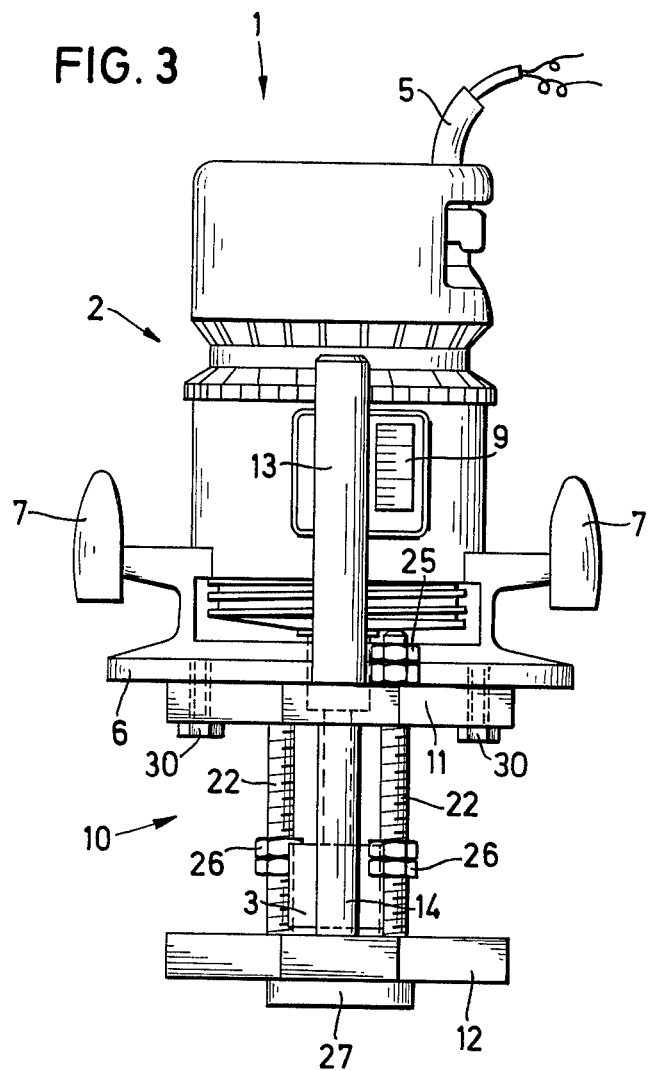

ADAPTOR FOR COUNTERSINKING DEVICE

The present invention is directed to an adaptor for countersinking devices particularly for making recesses of greater diameter for hinge elements in "pot" form when hinges are fitted to furniture.

Countersinking devices of the type to which this invention is directed are also called top milling cutters and generally include a housing for a motor which in turn carries a countersinking tool. In such assemblies, the countersinking tool projects beyond a guide plate firmly secured to the housing. When milling or boring holes in furniture, elements or the like, it is extremely important that the countersunk hole, most often than not, a pot or pocket hole, is provided at an exactly predermined site of the particular piece of furniture. To this end, use is made of templates in which the guide elements for the tool are predetermined. On the other hand, it is necessary also that the depth of the milling or boring hole exactly correspond to the predetermined depth dimension of the pot-shaped hinge element because its upper surface has to be in conformity or flush with either the door or the frame of the furniture.

Until the present invention, the correct depth of the milling or boring hole was left to the experience and skill of the operator. The countersinking tool of the manually operated countersinking device was guided to the predetermined site by the template and this generally was deficient to correctly position the milling or boring hole. However, the depth of the milling or boring hole substantially resulted from eye measurement. In the case of an experienced operator, it could be more or less expected that the work was performed generally satisfactorily. However, even under expert or experienced operators control it was found that after treating of the milling or boring hole had to be performed, and such work could be performed only relatively slowly manually.

In keeping with the foregoing, it is a primary object of the present invention to provide a novel manual countersinking device of the type mentioned at the outset hereof which permits the exact depth of the milling hole to be predetermined and to carry the cutting-out relatively rapidly from one milling hole site to another.

The present invention is particularly characterized in that the adaptor has a pair of plates relatively displaceable and normally urged away from each other by springs, with one of the plates carrying a countersinking tool and displacement of the two plates being definable by an adjustable stop to regulate in a finite manner the depth of the bored hole.

Due to the particular construction of the adaptor, a hand tool is provided by which the depth of the hole to be produced can be determined safely and reliably and maintained during the actual milling operation. When applying the countersinking device at a template or the like, the adaptor must simply be pressed against the template or the furniture element and upon the exertion of such pressure, the construction of the adaptor ensures that the device is applied at correct angles relative to the template or the furniture element respectively, and that the countersinking tool is moved accordingly. Furthermore, the countersinking tool cannot cut more deeply into the furniture element or the like than the depth predetermined by the adjustable stop. Thus, exact and correct holes are produced and one is no longer dependent upon the skill of the operator. It is possible to carry out the work quickly, simply and easily by a non-experienced man. At the same time, due to the adaptor being firmly connected to the manual countersinking device, the countersinking tool is substantially protected within the adaptor so that there is practically no risk of damaging the countersinking or countersink tool. It is in this way possible to perform an absolute exact milling or boring operation.

In accordance with a further object of this invention, the sleeves which normally urge the plates toward a relative position of maximum spacing are defined by at least one sleeve connected to each plate, the sleeves being in telescopic relationship, and a spring within the sleeves urging sleeves toward a position of minimum telescopic relationship thus moving the plates toward their maximum spacing. By this construction, the plates cannot only be resiliently displaced toward each other, but they also have firm guidance relative to each other due to their telescopic relationship. This, obviously, implies the further advantage that the spring or springs are covered so that they cannot be subjected to corrosion or other deterioration. Such a sleeve or sleeves are advantageously provided preferably at opposite ends of both plates.

In further accordance with this invention, a pair of adjustable stops are provided which are formed as threaded elements or bolts with each stop being connected to one of the plates and passing through a bore of the other of the plates. A pair of bolts are carried by each threaded member between the plates and above the plate having the bore therein. Thus, by adjusting the bolts, the movement of the upper plate toward the lower plate can be accurately adjusted, thus, regulating the depth of the countersinking tool when in use. Preferably, the stop elements are off-set relative to the central longitudinal axis of the plates which permits easier and better operation of the nuts and sufficient room for appropriate wrenches to be applied.

In further accordance with this invention, the sleeves and stop pins are arranged at the ends of the plates to ensure between them a sizable distance for operating clearance and also to make certain that the displacement of the plates relative to each other is extremely exact.

Of the two plates, the lowermost one thereof, is apertured and receives a guide ring which is preferably interchangeable. The guide ring may be provided with a peripheral flange engaging in an annular groove of the lower plate and is suitably secured to the plate by means of locking screws resting with their heads at the peripheral flange, thus, retaining it to the lower plate and precluding the guide ring from longitudinal displacement.

With the above and other objects in view that will hereinafter appear, the nature of the invention will be more clearly understood by reference to the following detailed description, the appended claimed subject matter, and the several views illustrated in the accompanying drawing.

IN THE DRAWINGS

FIG. 3 is a side-elevational view of the novel adaptor illustrating details thereof.

Figure 1:
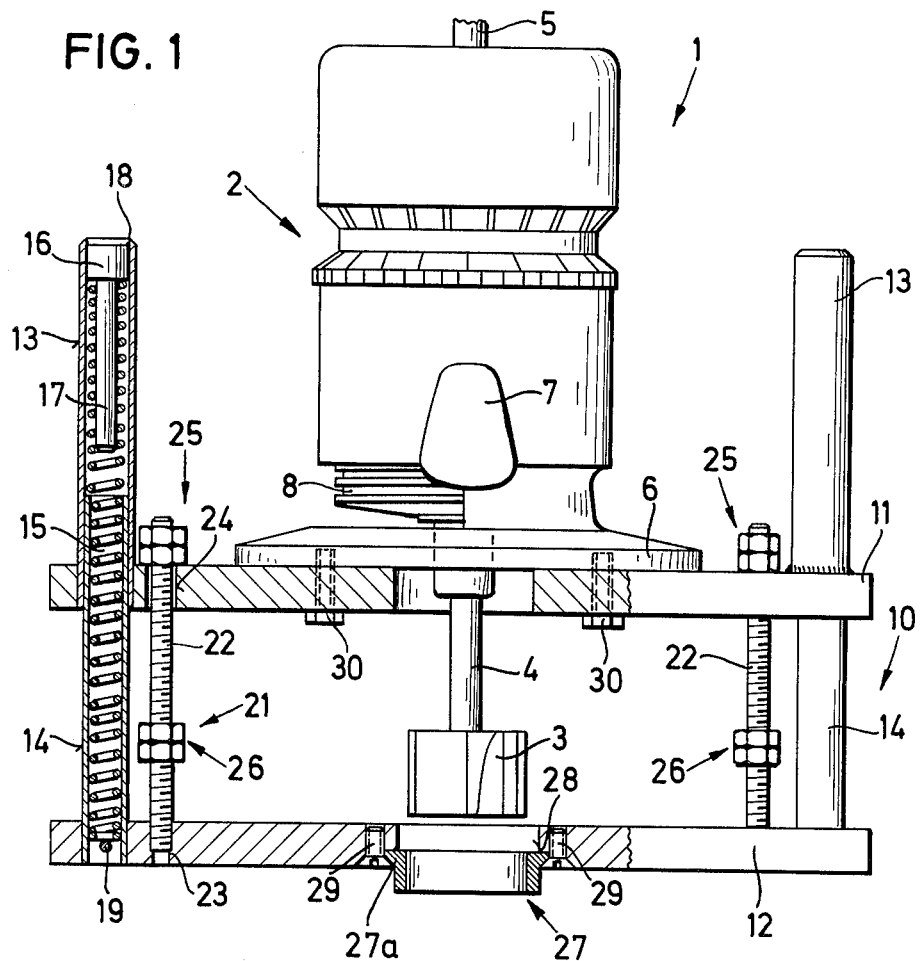
FIG. 1 is a side-elevational view with portions broken-away for clarity of the adaptor of this invention, and illustrates a pair of relatively movable plates, telescopically disposed guide sleeves, and threaded bolts carrying nuts for limiting the relative movement of the place between maximum and minimum spacing therebetween.

A manual countersinking device is generally designated by the reference numeral 1 (FIGS. 1 and 3) and includes a housing 2 in which a motor and a motor-driven countersink or countersinking tool 3 are supported. The countersink tool 3 is supported by a shaft 4 of the motor (not shown) within the housing 2 which is energized by a suitable electrical power source to electrical wiring 5. A guide plate 6 is firmly secured by means not shown to the housing 2. The housing is also provided with conventional handles 7. The countersinking device 1 is also provided with conventional height adjustment devices 8, 9 (FIGS. 1 and 3, respectively), but these adjustments are used only when the countersinking device 1 is not in operation. When in operation the tool 3 has an established and arrested distance from the housing 2 or the guide plate 6.

Figure 2:
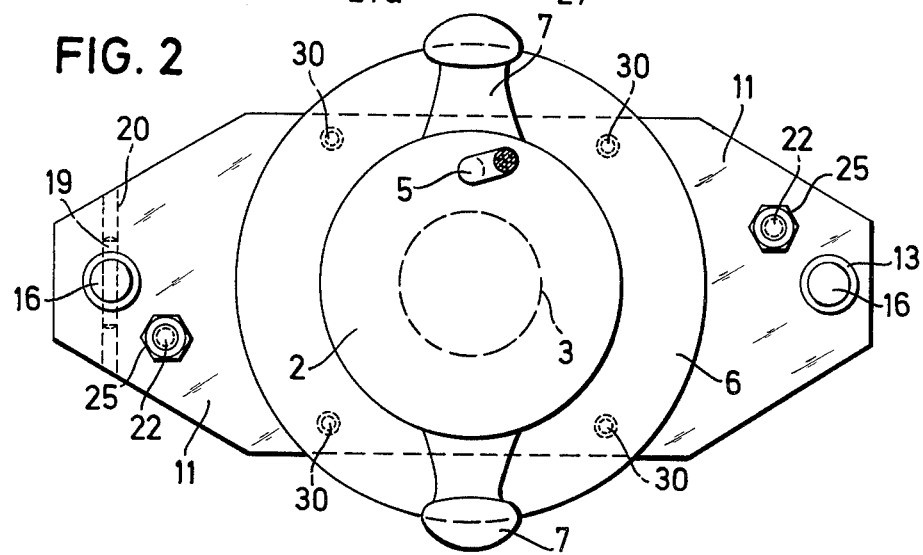
FIG. 2 is a top plan view of the adaptor, and illustrates the manner in which the telescopic sleeves and threaded adjusting pins are disposed at remote ends of the plates.

An adaptor 10 of this invention for establishing exact depths of milling holes or bore holes in a furniture element or the like is composed of two plates 11 and 12 which are in parallel relationsh9p to each other and are displaceable relative to each other. Each of the plates 11, 12 is fitted with sleeves 13, 14 respectively, which are telescoped into each other with the sleeves 13 being firmly affixed by welding or the like to the plate 11 and the sleeves 14 being firmly affixed in bores (unnumbered) of the plate 12. Within the telescopic sleeves 13, 14, is located a spring 15 which at one end abuts the underside of a plug 16 carrying a guide stem 17. The plug is retained in the position shown to the left in FIG. 1 by crimping over an end portion 18 of the sleeve 13. The lower end of the spring 15, bottoms upon a cross-pin 19 housed within a bore 20 (FIG. 2). But when the cross-pin 19 is removed from the bore 20, the spring may be extracted and replaced, if necessary, by another spring.

Though the plates 11 and 12 can be displaced toward or away from each other, suitable adjustable stop means 21 are provided in the form of threaded pins or threaded members 22, each of which is firmly screwed in a threaded bore 23 of the lower plate 12. The upper end portions (unnumbered) of the stop pins 22 pass through bores 24 in the upper plate 11 and have secured thereto a pair of nuts 25. Likewise, a pair of nuts 26 are threaded to each of the stop or adjusting pins between the plates 11, 12.

The nuts 25 and 26 can be moved along the threaded members 22 in order to establish the maximum distance between the plates 11, 12 which is accomplished by the nuts 25 and the minimum distance therebetween which is accomplished by the lower surface (unnumbered) of the plate 11 bottoming against the uppermost of the pairs of nuts 26.

The plate 12 also carries a guide ring 27 which functions to support and guide the milling or countersink tool 3 as the plate 11 is lowered relative to the plate 12. The guide ring 27 is interchangeable relative to the plate 12 and has a flange or collar 27a resting in an annular groove 28 of the plate 12 which is a counter-bore of larger aperture means (unnumbered). A retention of the guide ring 27 is achieved by locking screws 29 whose heads engage the collar 27a of the guide ring 27. As a result, the guide ring 27 can be interchanged with other guide rings having bores of different diameters.

The adaptor 10 is secured to the countersinking device 1 in any suitable manner as, for example, by way of screws 30 engaging into the guide plate 6 of the housing 2. Thus, the manual countersinking device 1 forms together with the adaptor 10 a uniform tool which is actuated and handled as it is. By pressing down the housing 2 with the handle 7 the plate 11 moves downwardly relative to the plate 12 which is preferably resting against a template, and this is achieved until the downward displacement of the plate 11 is stopped by the nuts 26. The countersinking tool 3 correspondingly engages through the guide ring 27 and through the non-illustrated template into the furniture element to a depth as limited by the stop nuts 26.

It is convenient to dispose the stop means or pins 22 to be somewhat off-set relative to a longitudinal centerline of the plates 11, 12 in order that the actuation of the nuts 25, 26 is facilitated when screw wrenches are applied. There is also more freedom between the stop means 21 and the sleeves 13, 14 when, thus, off-set.

While preferred forms and arrangement of parts have been shown in illustrating the invention, it is to be clearly understood that various changes in details and arrangement of parts may be made without departing from the scope and spirit of this disclosure.

We claim:

1. An adapter for a countersinking device comprising first and second plates disposed in generally parallel relationship to each other and being relatively movable in a direction generally normal to said plates, said first plate carrying a countersinking tool, said second plate being disposed below said first plate and having aperture means in alignment with said countersinking tool, means normally urging said plates toward a relative position of maximum spacing therebetween, said urging means including two pair of sleeves with a first end portion of a first sleeve of each pair of sleeves being in telescopic relationship with a first end portion of a second sleeve of each pair of sleeves, a second end portion of each first sleeve being connected to said second plate, said first end portions of said second sleeves being connected to said first plate, a spring housed within each pair of sleeves urging the plates toward the position of maximum spacing therebetween, adjustable stop means for limiting the relative movement of said plates toward both said positions of minimum and maximum spacing, said adjustable stop means being defined by a pair of threaded pins each carrying two pair of nuts, each threaded pin being connected to one of said plates and passing freely through an opening of another of said plates, a first pair of said nuts being disposed between said plates and a second pair of said nuts being disposed above said first plate, said aperture means having an axis, and an imaginary line passing through said pins being offset from the axis of said aperture means.

2. The adapter as defined in claim 1 including a guide ring disposed adjacent said aperture means having an axis conincident therewith.

3. The adapter as defined in claim 2 including means for removably securing said guide ring to said second plate for ready interchangeability of other guide rings and countersinking tools.

4. The adapter as defined in claim 3 wherein said guide ring has a flange, screws threaded into said second plate, and said screws have heads bearing against said flange for retaining said guide ring against said second plate.

* * * * *